United States Patent Office 3,618,240
Patented Nov. 9, 1971

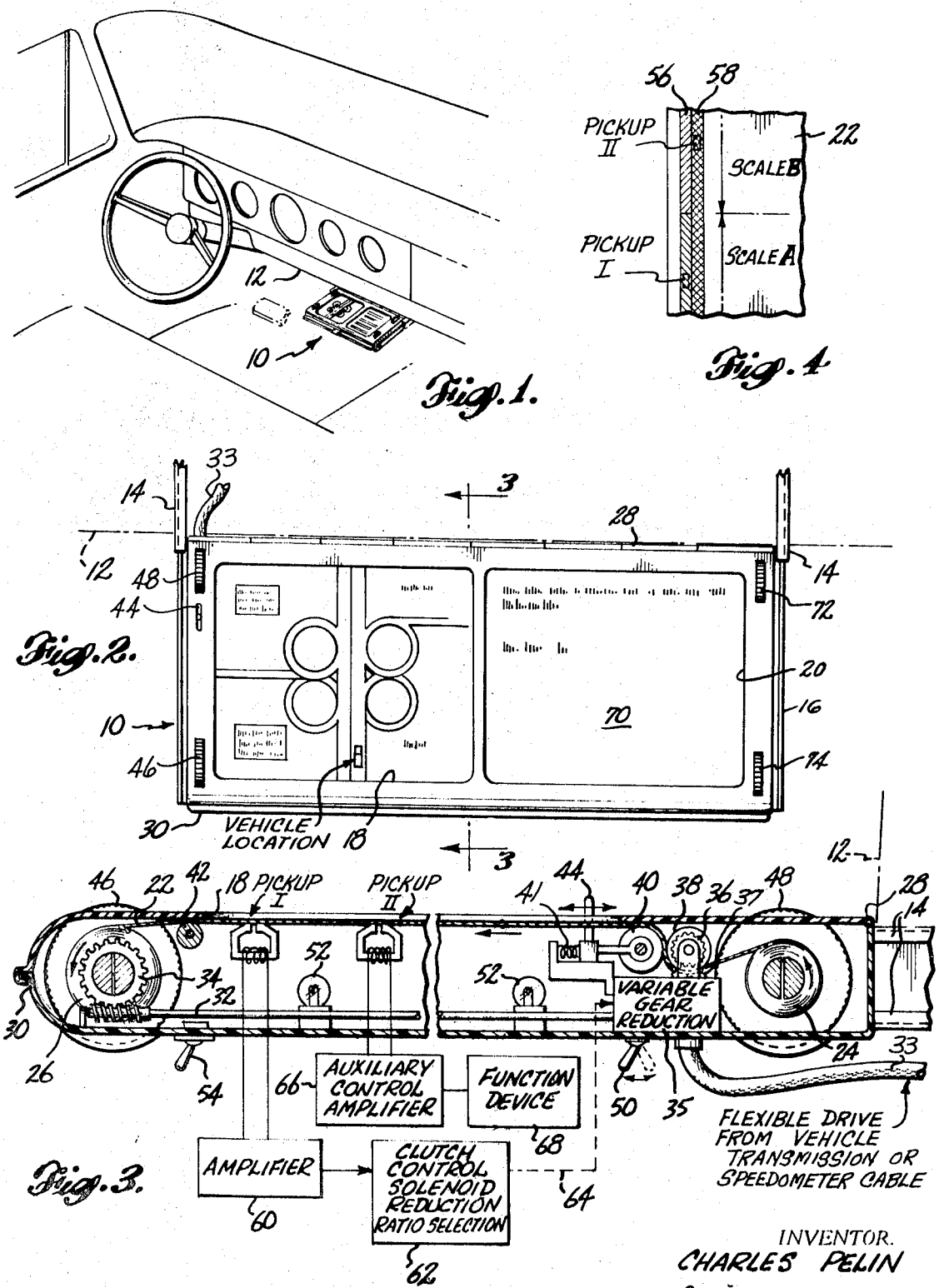

3,618,240
ROUTE MAP AND FEATURE DISPLAY DEVICE
FOR MOVING VEHICLES
Charles Pelin, Box 75, Eastsound, Wash. 98245
Filed Sept. 5, 1967, Ser. No. 665,349
Int. Cl. G09f 11/24
U.S. Cl. 40—42                                   5 Claims

ABSTRACT OF THE DISCLOSURE

A route map and feature display device for use in a moving vehicle, including an information strip carrying information the distance scale of which changes along its length, feed and take-up means for holding the strip, means for displaying information exposed on the strip between the feed and take-up means, and drive means for advancing the strip progressively as a function of distance traveled. The drive means which varies the strip drive speed as a function of vehicle speed includes means responsive to the strip scale changes to change the drive ratio accordingly. An elongated flexible drive cable permits moving the display unit into different viewing positions when in use.

BACKGROUND OF THE INVENTION

This invention relates to devices for assisting operators and passengers of moving vehicles while traveling to obtain information relating to routes, distances, points of interest, danger spots, elevation, food, lodging, service areas, and the like. In particular it relates to a device containing a strip or film carrying such information for display and operating automatically in accordance with the speed of the vehicle and in accordance with varying distance scales upon which the information is recorded on the strip. While the invention is illustrated herein in accordance with the preferred form thereof, various possible modifications and changes within the scope of the principles involved will be recognized by those skilled in the art.

In the past various devices have been provided for displaying strip maps and the like in automobiles for informational assistance while traveling. These have commonly included means coupled to the speedometer cable or transmission or having some other speed-associated drive connection for moving the strip in accordance with the speed of the vehicle. Typical features have included a display window through which the strip map is observed, the map including markings for distances to cities and sights ahead, danger spots, intersections and the like. Some have included means for operating sound reproducing devices to give audible indications of points ahead, descriptions, and other information. Various refinements in such devices have been developed, especially in the drive mechanism, including means for manually changing the gear ratio in the drive means to compensate for tire wear or changes in tire pressure.

The present invention seeks to improve upon such devices by providing a variable scale strip map to accommodate travelers on those occasions when larger or smaller scale maps may be more useful, and by providing means for automatically altering the speed of the strip map in accordance with map scale changes, as well as in accordance with changes in the speed of the vehicle. Accordingly the invention provides a variable scale strip map for use in such display devices, with means on the strip map for indicating scale changes. The invention further provides means responsive to the scale indicating means and interposed in the drive connection to alter the strip drive speed (i.e. the ratio of map speed to vehicle speed) in accordance with scale changes.

In accordance with a secondary object the invention provides auxiliary means for operating separate function devices, such as sound reproducing means to deliver audible messages as the vehicle travels along the route selected.

In the preferred embodiment of the invention a first display window is provided through which a variable scale map is viewed as it passes from a feed roll to a take-up roll driven in response to motion of the vehicle. While the map is viewed directly in this embodiment, within the scope of the invention it can be replaced by a film and means for projecting images from the film onto a screen or the like, or it can be replaced by videotape for television reproduction, for example. Sound messages may be recorded on the strip map itself for direct reproduction as the strip map is driven through the device.

The preferred embodiment includes a secondary display window for displaying information contained on a second strip carried on feed and take-up rolls driven intermittently in response to messages recorded on the main strip map. The secondary display means may include sound reproduction means so that the driver or passengers may hear lectures on historic sites being approached, or music for long stretches of relatively uneventful travel, or advertising messages of a sponsoring company marketing the strip maps and accompanying information.

While the preferred embodiment is adapted for mounting on the vehicle dashboard detachably on a flexible drive cable so that it can be viewed in different positions, the invention encompasses similar devices located or mounted in other ways, such as by rear seat passengers.

These and other features, objects and advantages of the invention will be better appreciated from examination of the following more detailed description of the preferred form of the invention, taken in connection with the accompanying drawing which illustrates the same in somewhat schematic form.

BRIEF DESCRIPTION OF THE DRAWING

FIG. 1 is an isometric view illustrating the preferred embodiment of the invention mounted beneath the dashboard of an automobile so that it is readily visible by occupants of the front seat.

FIG. 2 is a plan view of the device of FIG. 1 on a larger scale.

FIG. 3 is an enlarged sectional view taken along lines 3—3 of FIG. 2 illustrating details of the preferred embodiment schematically and including block diagrams designating electrically operative features of the device.

FIG. 4 is a plan view of a portion of the variable scale information strip used in the device, showing relative locations of first and second information pick-up devices.

DESCRIPTION OF THE PREFERRED EMBODIMENT

Although the invention is suited for use with vehicles other than automobiles, the preferred embodiment of the device 10 is detachably mounted beneath the dashboard 12 of an automobile in any suitable manner symbolized by brackets 14 which hold the device in generally horizontal position with the display windows facing up or tilted slightly toward the rear of the automobile for visibility by the occupants. The display unit 10 comprises a housing 16 of generally rectangular shape and having first and second windows 18 and 20 covered with shatterproof plastic, Plexiglas or the like for visibility of the contents of the unit. It contains a first strip map 22 held on feed and take-up rollers 24 and 26 and driven from the former to the latter past the window 18 for display. The top of the unit is hinged at 28 along the edge next to the dash and unsnaps along the rear edge 30 to swing upwardly out of the way for removal and insertion of strip map rolls containing information on different selected routes.

The strip map 22 is driven, illustratively, by a flexible drive cable 33 connecting the vehicle transmission or speedometer cable and a variable gear reduction map drive unit 35. Cable 33 is longer than need be with the unit 10 in its normal mounted position so as to permit it to be moved about in use, detached from the dashboard mounting. The gear unit 35 drives a worm gear rod 32 engaging a gear wheel 34 to which the take-up roller 26 is attached through a suitable clutch connection (not shown). While this take-up roller 26 is driven to take up slack which would otherwise occur in the strip map 22, the map is positively engaged and driven by a roller 38 connected to sprocket wheel 36 which is driven by a gear wheel 37 in the gear reduction unit 35. A guide roller 40 is urged toward drive roller 38 by spring 41 to grip the information strip 22 therebetween and feed it from feed roller 24 to take-up roller 26. Guide roller 40 and a second guide roller 42 to hold the strip in a plane adjacent to the window 18. Pressure on the information strip by roller 40 can be released by means of lever 44 for insertion and removal of different information strips or for manually advancing or backtracking the strip as described below.

Suitable clutch connections (not shown) between drive sprocket 34 and take-up roller 26 and between drive sprocket 36 and drive roller 38 permit the operator to stop or back-track the information strip against the applied drive force, by means of thumb knobs 46 and 48. Lever 44 permits release of drive force while this is done. The drive can also be taken out of gear by means of a clutch lever 50 on the underside of the variable gear reduction unit 35. The clutch connections and thumb knobs 46 and 48 permit ready adjustment of the position of the strip map during travel to correct for misalignment with landmarks, signs or the like because of departures from the route indicated on the strip or for other reasons.

Lights 52 connectable to the dash lights of the automobile and operated by an interposed switch 54 provide illumination of the strip maps from beneath.

In the illustrated embodiment of the strip map itself, a portion of which is shown in FIG. 4, the strip 22 carries information magnetically recorded along first and second tracks 56 and 58 near the edge of the strip. Along the length of the map the information depicting the highway route, interchanges, etc. is imprinted with different distance scales A and B. The magnetically recorded information on track 56 includes an indication of the change of scale from A to B, coordinated so that a speed change will result at the appropriate time when a scale change is reached, as described below.

Suitable pick-up units I and II are mounted within housing 16 in positions associated with tracks 56 and 58 respectively. The scale change indication recorded on track 56 is detected by electromagnetic pick-up I and amplified by a suitable amplifier 60, whereupon the signal is delivered to a clutch control solenoid device 62. In response to the received signal the solenoid device 62, acting through an electromechanical connection 64, changes the variable gear ratio on gear reduction drive unit 35, changing the drive speed of the information strip. Clutch control solenoid unit 62 and variable gear device 35 can be of any suitable type constructed in accordance with well known technology. Preferably the change-of-scale pick-up is so located in relation to the scale recording that ratio of map speed to vehicle speed is made to change when the transverse line of map scale change reaches the midpoint in crossing to viewing window 18.

Pick-up II associated with track 58 is electrically coupled to an auxiilary control amplifier 66. Responsive to this auxiliary amplifier is a function device 68 operable to control any of different mechanisms, such as sound reproducing means for delivering audible messages regarding points of interest, danger spots or the like along the way. In the preferred embodiment this function device 68 is operable to advance past window 20 a second information strip 70 carrying written messages, photographs, maps for side strips to points of interest off the main route, advertising matter, and other explanatory material. Optionally this strip may be advanced from bottom to top rather than from top to bottom as in the case of the main strip map 22, to facilitate reading of printed matter thereon. The mechanism for driving this secondary information strip is similar to that for the main strip map 22 and is therefore not shown. It includes clutch connections to permit manual advancement, back-tracking or stopping of the strip by means of thumb knobs 72 and 74.

Messages magnetically recorded on track 58 deliver to auxiliary control amplifier 66 a signal instructing function device 68 to advance auxiliary strip 70 at appropriate times relative to the position of the main route map 22, so that messages contained on the auxiliary strip are coordinatively timed to best advantage. The auxiliary information strip may be used alone or in combination with sound reproducing apparatus, so that photographic material on the auxiliary strip 70 can be observed while recorded messages are heard for still greater effectiveness.

Other advantages and modifications of the device will be recognized by those skilled in the art.

What is claimed is:

1. A route map and feature display device for use in a moving vehicle, comprising an information strip containing route information and having a varying distance scale along its length, means for displaying information contained on said strip, feed and take-up means for holding said strip, drive means coupled to one of the strip holding means and operable to move said strip through said display means, said drive means including means responsive to the speed of the vehicle and coupled to vary the drive speed of said strip in accordance with variations in vehicle speed, said drive means further including means interposed in the coupling of the drive means to the strip holding means and responsively coupled to vary the strip drive speed additionally in response to variations in said scale.

2. A route map and feature display device for use in a moving vehicle, comprising an element carrying route information on a distance scale which varies along said element, means on said element indicating the scale of said information at all points along said element, means for displaying portions of the information carried on said element, and drive means operable to move said element relative to said display means to display successive portions of said information, said drive means including means responsive to the speed of the vehicle and coupled to vary the drive speed of said element in accordance with variations in vehicle speed, and further including means responsive to the scale indicating means on said element for varying the drive speed also in accordance with variations in said scale.

3. The device defined in claim 2 wherein said scale indicating means comprises signals magnetically recorded along a longitudinal track on said element, and said drive means includes magnetic pick-up means positioned relative to said track to detect said signals and drive ratio altering means responsive to the pick-up means for effecting a change in the drive speed of said element in accordance with said signals.

4. A route map display device for use in a moving vehicle, comprising an elongated strip map the distance scale of which is temporarily increased at locations of interest along the route depicted by said map, said map having such distance scale increases detectably recorded thereon at corresponding locations along the length thereof, and display means including a device for viewing successive map sections, and drive means for moving the map lengthwise relative to the viewing device including a driven member, means to operate such driven member to produce a map speed related to map scale and bearing a predetermined drive ratio to vehicle speed, and control means arranged to sense recorded map scale changes and operable to change said drive ratio automatically in response to map scale changes.

5. The device defined in claim 4, wherein the means to operate the driven member includes an elongated flexible rotary cable member connected between the vehicle and the driven member, such cable permitting the display means to be moved about when in use in the vehicle.

References Cited

UNITED STATES PATENTS

| 1,690,244 | 11/1928 | Periale | 40—42 |
| 1,853,458 | 4/1932 | Rullman | 40—42 |
| 2,923,921 | 2/1960 | Shapin | 40—53 A UX |

FOREIGN PATENTS

| 693,403 | 8/1930 | France | 40—42 |

ROBERT W. MICHELL, Primary Examiner

R. CARTER, Assistant Examiner

U.S. Cl. X.R.

340—378